(12) United States Patent
Tanju (10) Patent No.: US 7,768,908 B2
(45) Date of Patent: Aug. 3, 2010

(54) SYSTEMS AND METHODS OF PROVIDING REDUNDANT COMMUNICATION TO AN ELECTRONIC DEVICE

(75) Inventor: Baha T. Tanju, Houston, TX (US)

(73) Assignee: Cameron International Corporation, Houston, TX (US)

( * ) Notice: Subject to any disclaimer, the term of this patent is extended or adjusted under 35 U.S.C. 154(b) by 1168 days.

(21) Appl. No.: 10/825,337

(22) Filed: Apr. 15, 2004

(65) Prior Publication Data
US 2005/0232145 A1 Oct. 20, 2005

(51) Int. Cl.
G01R 31/08 (2006.01)
H04L 12/413 (2006.01)

(52) U.S. Cl. ........................ 370/225; 370/447

(58) Field of Classification Search ................. 370/217, 370/229–240; 710/316; 340/825–825.98
See application file for complete search history.

(56) References Cited

U.S. PATENT DOCUMENTS

| | | | |
|---|---|---|---|
| 4,812,840 A | 3/1989 | Girard | |
| 5,038,318 A | 8/1991 | Roseman | |
| 5,587,707 A * | 12/1996 | Dickie et al. | 340/870.09 |
| 6,116,345 A * | 9/2000 | Fontana et al. | 166/343 |
| 6,757,777 B1 | 6/2004 | Griessbach et al. | |
| 6,910,078 B1 * | 6/2005 | Raman et al. | 709/231 |
| 2002/0101888 A1 * | 8/2002 | Keck et al. | 370/537 |

FOREIGN PATENT DOCUMENTS

| | | |
|---|---|---|
| EP | 0545001 | 6/1993 |
| WO | WO9952245 | 10/1999 |

OTHER PUBLICATIONS

Combined Search and Examination Report Dated Aug. 11, 2005 for Appln. No. GB0507539.5 (7 p.).

* cited by examiner

*Primary Examiner*—Chirag G Shah
*Assistant Examiner*—Nima Mahmoudzadeh
(74) *Attorney, Agent, or Firm*—Conley Rose, P.C.

(57) ABSTRACT

In at least some embodiments a system may comprise a first master device, a second master device, a redundancy manager coupled to the first and second master devices, and a slave device coupled to the redundancy manager. The redundancy manager is operable to receive a first data stream from the first master device and a second data stream from the second master device. The redundancy manager is further operable to selectively forward one of the first and second data streams to the slave device according to a prioritization of factors calculated to optimize an amount of valid communication to the slave device.

24 Claims, 5 Drawing Sheets

FIGURE 5

SYSTEMS AND METHODS OF PROVIDING REDUNDANT COMMUNICATION TO AN ELECTRONIC DEVICE

CROSS-REFERENCE TO RELATED DOCUMENTS

This application contains subject matter that may be related to the doctoral dissertation, "Redundancy Manager for Subsea Control Systems" by Baha T. Tanju. The above referenced dissertation is to be submitted to Kennedy Western University after the filing of this Application and is hereby incorporated by reference.

BACKGROUND

Modern petroleum exploration and drilling systems (hereinafter referred to as "petroleum mining systems") may implement electronic-based tools in remote locations (e.g., downhole locations or subsea locations). For example, the tools may comprise sensors, actuators, motors, drills, or other electronic-based tools. To communicate with and/or control the tools, a user interface such as a computer at the earth/sea surface may be employed. If the ability to communicate with and/or control the tools is lost or delayed, undesirable costs may be incurred. For example, the costs may be associated with replacing or repairing at least part of a petroleum mining system. The costs also may be associated with downtime of the petroleum mining system.

To reduce the frequency of incurring such costs, some petroleum mining systems implement redundant electronics to communicate with and/or control the remote tools. For example, an existing petroleum mining system may implement multiple user interfaces having a programmable logic controller (PLC) assigned to each user interface. Therefore, if one PLC malfunctions, or is otherwise inoperable, another PLC may be configured to transmit data from a user interface to the remote tools. However, implementing the redundant PLC system is expensive. Moreover, improvements in the reliability of petroleum mining systems are desirable.

SUMMARY

In at least some embodiments a system may comprise a first master device, a second master device, a redundancy manager coupled to the first and second master devices, and a slave device coupled to the redundancy manager. The redundancy manager is operable to receive a first data stream from the first master device and a second data stream from the second master device. The redundancy manager is further operable to selectively forward one of the first and second data streams to the slave device according to a prioritization of factors calculated to optimize an amount of valid communication to the slave device.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Embodiments of the invention are directed to systems and methods of providing redundant data communication to one or more electronic slave devices. As used herein, an electronic slave device refers to any device that is configured to perform a function according to data provided by a master device such as a computer. For example, an electronic slave device may comprise a tool or sensor implemented in a petroleum mining system.

In at least some embodiments, a redundancy manager device coupled between the electronic slave device and a plurality of master devices may provide redundant data communication to one or more electronic slave devices. The redundancy manager device is preferably configurable to selectively forward data from one of the plurality of master devices to the slave device. The master device associated with the data that is forwarded to the slave device is said to have "mastership" of the slave device. Preferably one master device has mastership of the slave device while the other master devices are "idle" masters devices. Implementing the redundancy manager device in such a system is intended to provide several benefits. For example, the redundancy manager may improve the reliability and availability of data communications to a slave device, simplify redundant system designs, provide low cost system redundancy, permit high-speed communication between a master device and a slave device and/or provide other benefits.

Figure 1:
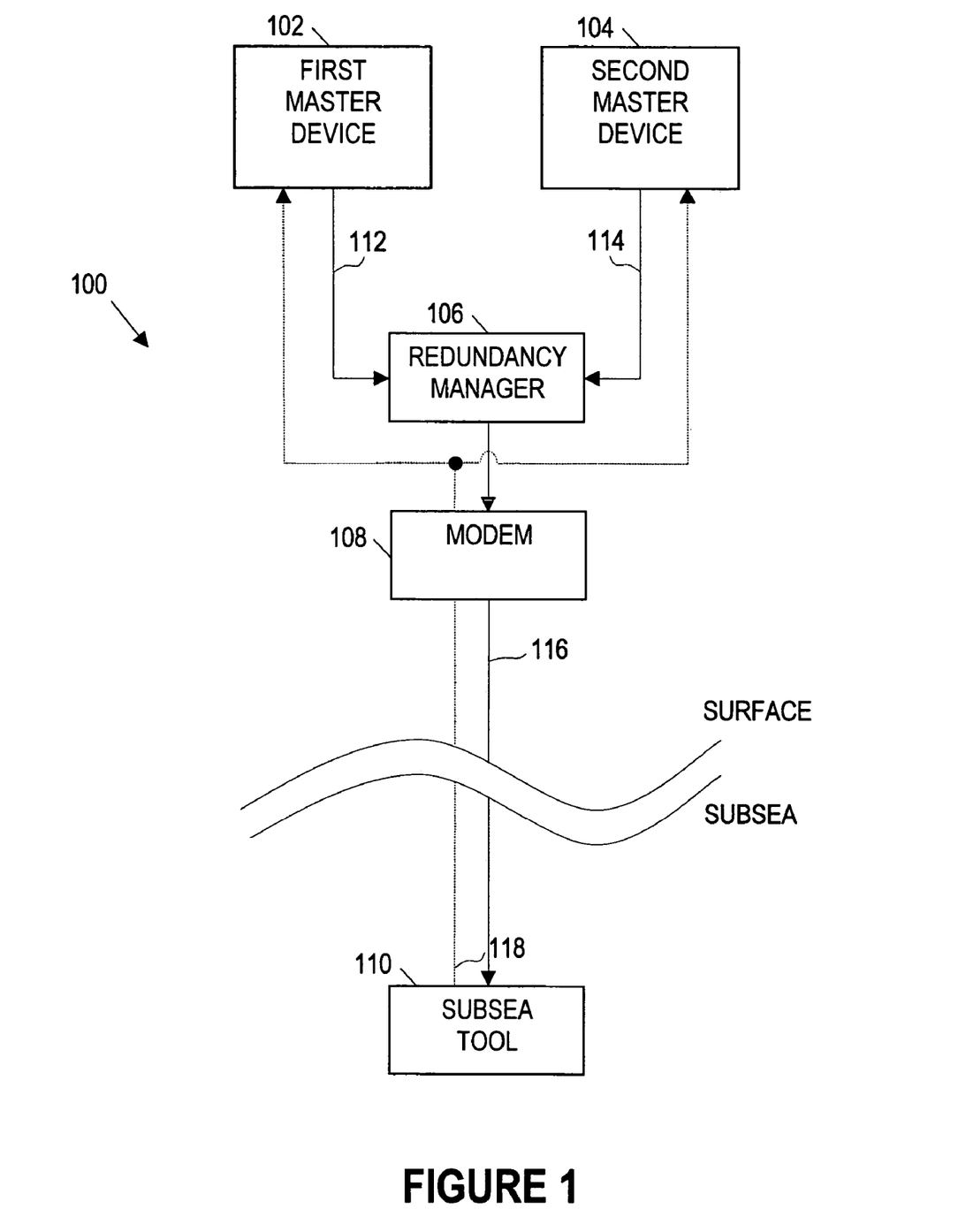
FIG. 1 illustrates a petroleum mining system in accordance with preferred embodiments of the invention.

FIG. 1 illustrates a system 100 in accordance with preferred embodiments of the invention. In particular, the system 100 illustrates a redundancy manager device 106 implemented in a petroleum mining system. As shown in FIG. 1, the system 100 may comprise a redundancy manager 106 coupled to a first master device 102 and a second master device 104. The redundancy manager 106 also may couple to a modem 108. As shown in FIG. 1, the modem 108 may couple to a subsea tool 110.

In at least some embodiments, the redundancy manager 106 is operable to examine a data stream 112 received from the first master device 102. The data stream 112 may comprise, for example, data packets of encoded information such as a sender address (i.e., an address assigned to the first master device 102), a recipient address (i.e., an address assigned to the subsea tool 110), a command, data, and CRC (cyclic redundancy check) information. The redundancy manager 106 is further operable to examine a data stream 114 received from the second master device 104. The data stream 114 also may comprise data packets of encoded information as described above.

The redundancy manager 106 preferably forwards one of the data streams 112 and 114 to the modem 108. The modem prepares the data stream received from the redundancy manager 106 for transmission to the subsea tool 110. Hereinafter the data stream output from the redundancy manager 106 will be referred to as the redundancy manager output (RMO) data.

The modem 108 may implement frequency modulation and/or phase modulation techniques to prepare the RMO data. Thereafter, the RMO data may be transmitted to the subsea tool 110 as a modulated analog signal via an electrical conductor 114. In at least some embodiments, the electrical conductor 114 may comprise a cable (e.g., a coaxial cable, a shielded twisted pair) that is several kilometers in length.

The subsea tool 110 may receive the modulated analog signal via the electrical conductor 114 and recover the RMO data using digitization, demodulation, decoding and/or other techniques. The RMO data may cause the subsea tool 110 to perform one or more functions such as operating a motor, operating an actuator, outputting sensor measurements, etc. Alternatively, the subsea tool 110 may ignore the RMO data as will later be described.

The subsea tool 110 also may function to transmit a data stream 118 to the first master device 102 and the second master device 104. The data stream 118 may comprise data packets of encoded information such as a sender address (i.e., the address of the subsea tool 110), a recipient address (i.e., an address assigned to the first master device 102 or the second master device 104), data, and CRC (cyclic redundancy check) information. Preferably, the recipient address of each data packet of the data stream 118 corresponds to the sender address of each data packet received by the subsea tool 110.

Both the first master device 102 and the second master device 104 may receive and examine the data stream 118 using digitization, demodulation, and decoding techniques. The data stream 118 may provide several types of information to the first master device 102 and the second master device 104. For example, the data stream 118 may include sensor data, subsea tool health information, a verification of received commands and/or data, a response to a query, or other information.

As previously explained, the redundancy manager 106 may select one of the data streams 112 and 114 to be forwarded to the subsea tool 110. The redundancy manager's selection to forward the first data stream 112 or the second data stream 114 may be based on a variety of factors such as whether the first master device 102 is functioning properly, whether the second master device 104 is functioning properly, whether the first master device 102 has requested to transfer mastership, whether the second master device 104 has requested to transfer mastership, timing considerations, or other factors.

In at least some embodiments, the redundancy manager 106 may be initially configured to forward the first data stream 112. If the redundancy manager 106 determines that the first data stream 112 is invalid, then the second data stream 114 may be forwarded to the subsea tool 110. Additionally, if the second master device 104 requests mastership, the redundancy manager 106 may forward the second data stream 114 to the subsea tool 110. The second master device 104 may request mastership using a predetermined command transmitted to the redundancy manager 106 via the second data stream 114. The second master device 104 also may request that mastership be transferred to the first master device 102 using another predetermined command transmitted to the redundancy manager 106 via the second data stream 114.

Preferably, the redundancy manager 106 operates to examine the data streams 112 and 114, but does not alter, store, or buffer the data streams 112 and 114. Therefore, a command to transfer mastership (or other non-slave commands), may be detected by the redundancy manager 106, but still may be forwarded to the subsea tool 110. Preferably, commands to transfer mastership have no significance to the subsea tool 110 and are ignored. Alternatively, the subsea device 110 may at least confirm that the command was received by transmitting a response to the master devices via the data stream 118.

In at least some embodiments, the master devices 102 and 104 may request to transfer mastership as controlled by a user and/or in response to the content of the data stream 118. For example, a user that does not have access to the first master device 102 (e.g., the master devices 102 and 104 may be far away from each other) may wish to transmit information to the subsea tool 110 using the second master device 104. Therefore, the user may access the second master device 104 and provide input (e.g., via a keyboard and/or a mouse) to request that the mastership be transferred from the first master device 102 to the second master device 104. Furthermore, a user of the second master device 104 may want to transfer mastership from the second master device 104 to the first master device 102. For example, the second master device 104 require servicing or may be needed to perform tasks other than communicating with the subsea tool 110.

The second master device 104 also may request mastership in response to the content of the data stream 118. For example, the data stream 118 may comprise data packets, each including a destination address and confirmation information (i.e., information that confirms that a command and/or data was received). If the destination address indicates that the subsea tool 110 received a data packet from the first master device 102 and the confirmation information indicates that the command and/or the data is not valid, the second master device 104 may request that mastership be transferred from the first master device 102 to the second master device 104.

Additionally or alternatively, the second master device 104 may request mastership when no data stream 118 is transmitted by the subsea device 110. The absence of the data stream 118 may be an indication that the first master device 102 is not effectively communicating with the subsea device 110. In at least some embodiments, the second master device 104 may be configured to wait for a predetermined amount of time after recognizing an input from a user to transfer mastership or after recognizing potential communication problems between the first master device 102 and the subsea tool 110 before transmitting a mastership transfer command to the redundancy manager 106.

Likewise, the first master device 102 may request mastership as controlled by a user and/or in response to the content of the data stream 118 in the same or similar fashion as described above for the second master device 104.

If neither of the data streams 112 and 114 are valid, the redundancy manager 106 may cycle between forwarding the first data stream 112 and the second data stream 114 until a valid data stream is discovered. The cycling may occur at a predetermined frequency such as every fifteen seconds.

Figure 2:
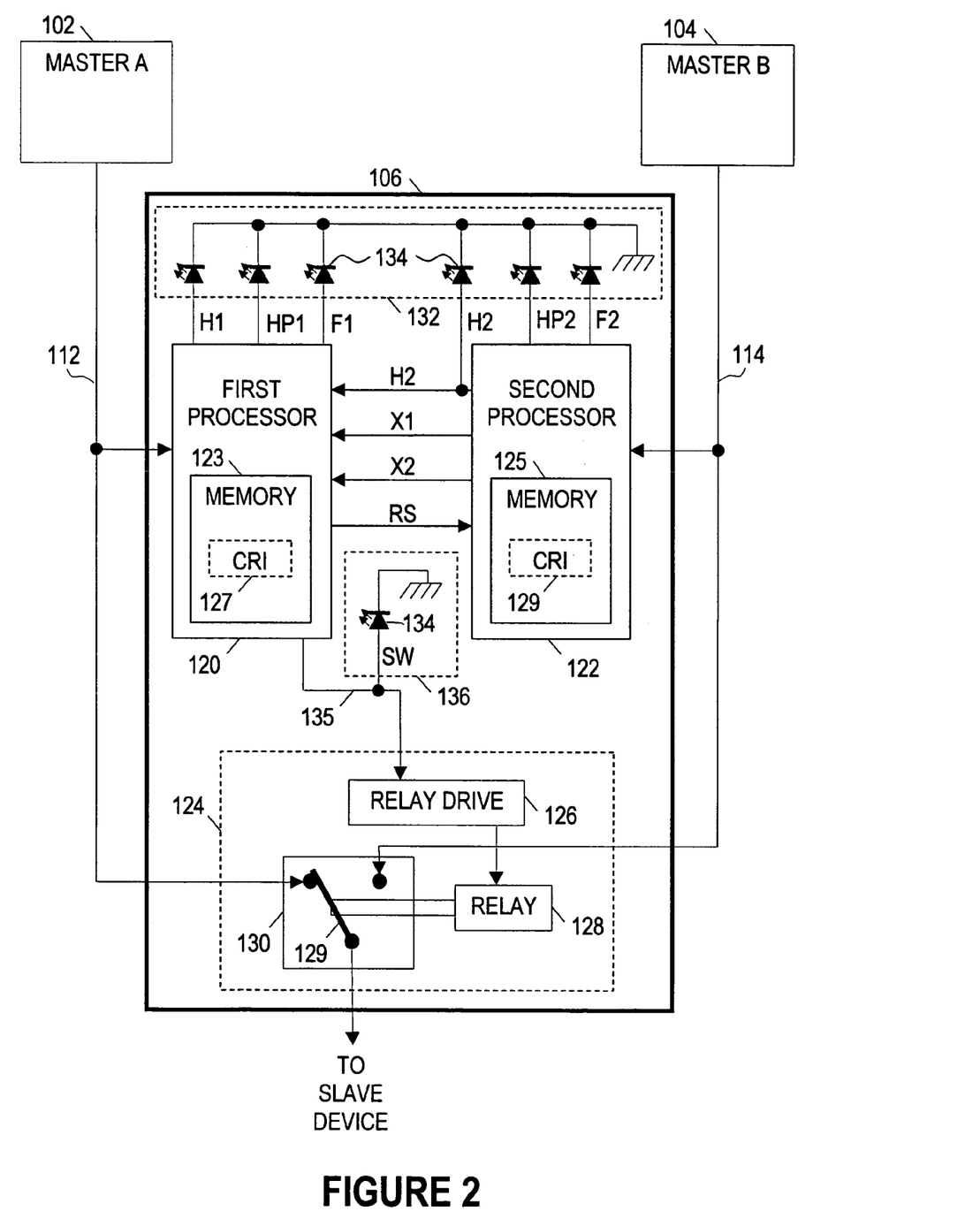
FIG. 2 illustrates a block diagram of a redundancy manager in accordance with preferred embodiments of the invention.

FIG. 2 illustrates a block diagram of a redundancy manager 106 in accordance with preferred embodiments of the invention. As shown in FIG. 2, the redundancy manager 106 may comprise a first processor 120 coupled to a second processor 122. The first processor 120 may comprise a memory 123 that stores computer-readable instructions 127. When executed by the first processor 120, the computer-readable instructions 127 preferably cause the first processor 120 to manage a switching device 124 and communicate with the second processor 122 as will later be described. The second processor 122 also may comprise a memory 125 that stores computer-readable instructions 129. When executed by the second processor 122, the computer-readable instructions 129 preferably cause the second processor 122 to communicate with the first processor 120 as will later be described.

As shown in FIG. 2, the first processor 120 may couple to the first master device 102 and may receive the first data stream 112 as input. Likewise, the second processor 122 may couple to the second master device 104 and may receive the second data stream 114 as input. The switching device 124 may couple to the first master device 102 and the second master device 104 and may receive the data streams 112 and 114 as input, whereby the switching device 124 forwards one of the data streams 112 and 114 to an electrical slave device such as the subsea tool 110 of FIG. 1.

In at least some embodiments, execution of the computer-readable instructions 127 may cause the first processor 120 to examine the first data stream 112 and determine if the first data stream 112 contains any errors such as invalid commands, addresses, data, etc. If the first processor 120 detects an error in the first data stream 112 (or if the first data stream 112 is not provided), the first processor 120 may assert a signal 135 to the switching device 124. In response to the signal 135 being asserted, the switching device 124 may forward the second data stream 114 instead of the first data stream 112 to a slave device. Additionally, execution of the computer-readable instructions 127 may cause the first processor 120 to wait a predetermined amount of time or detect a threshold number of errors before asserting the signal 135.

Furthermore, execution of the computer-readable instructions 127 may cause the first processor 120 to assert and de-assert the signal 135 in response to mastership transfer commands from the first master device 102. In some embodiments, two mastership transfer commands (hereinafter referred to as the "1-to-2 command" and the "2-to-1 command") may be implemented. The 1-to-2 command preferable causes the mastership to change from the first master device 102 to the second master device 104, while the 2-to-1 command causes the mastership to change from the second master device 104 to the first master device 102.

As an example, the first master device 102 may be configured to execute various applications in addition to providing the first data stream 112. Therefore, if the first master device 102 is overburdened with tasks, occupied with performing a high priority task, or is otherwise unable to satisfactorily provide the first data stream 112 to the subsea tool 110, the first master device 102 may send the 1-to-2 command to the first processor 120 via the first data stream 112. In response to receiving the 1-to-2 command, the first processor 120 may assert the signal 135 thereby causing the switching device 124 to transfer mastership from the first master device 102 to the second master device 104.

Alternatively, the first master device 102 may send the 2-to-1 command to the first processor 120. For example, the 2-to-1 command may be sent when the first master device 102 examines a data stream (e.g., the data stream 118) from the slave device and determines that the second master device 104 is not effectively communicating with and/or controlling the slave device. In response to receiving the 2-to-1 command, the first processor 120 may de-assert the signal 135 causing the mastership to change from the second master device 104 to the first master device 102.

In at least some embodiments, the signal 135 need not be continually asserted to provide mastership to the second master device 104 or continually de-asserted to provide mastership to the first master device 102. For example, the signal 135 may comprise a pulse signal transmitted by the first processor 120. Therefore, the switching device 124 may be configured to respond to one or more pulses by switching mastership to either the first master device 102 or the second master device 104 (e.g., one pulse may correspond to the first master device 102 and two pulses may correspond to the second master device 104). Alternatively, the switching device 124 may be configured to switch upon receive each consecutive pulse signal.

As shown in FIG. 2, the switching device 124 may comprise a relay 128 coupled between a relay drive 126 and a switch 130. In at least some embodiments, the relay drive 126 is configured to receive the signal 135. In response to an assertion of the signal 135, the relay drive 126 may provide power to the relay 128, which may comprise, for example, an electromechanical relay. Upon receiving power, the relay 128 may cause the switch 130 to forward the second data stream 114 to the subsea tool 110 instead of the first data stream 112. For example, the relay 128 may cause a metal contact 129 coupled to the subsea tool 110 to shift between contacting a conductor carrying the first data stream 112 and a conductor carry the second data stream 114.

While some switch device 124 embodiments may comprise the relay drive 126, the relay 128, and switch 130 as described above, other switch device 124 embodiments are available. For example, the switch device 124 may comprise a solid-state (semiconductor) switch. As implemented herein, the switch device 124 may comprise any electronic switch or electromechanical switch.

As explained above, the first processor 120 may control the switching device 124 according to several factors such as the validity of the first data stream 112 and mastership transfer commands received from the first master device 102. In addition, the first processor 120 may control the switching device 124 according to input received from the second processor 122. A description of the operation of the second processor 122 is given below.

The second processor 122 may be configured to execute the computer-readable instructions 129. In at least some embodiments, execution of the computer-readable instructions causes the second processor 122 to examine the second data stream 114 and determine if the second data stream 114 contains any errors such as invalid commands, addresses, data, etc. If the second processor 122 detects an error in the second data stream 114 (or if the second data stream 114 is not provided), the second processor 120 may assert a signal ("H2" or "health of master 2") to the first processor 120 that indicates when the second master device 104 is not functioning correctly.

Execution of the computer-readable instructions 129 may further cause the second processor 122 to assert signals (shown as "X1" and "X2" in FIG. 2) to the first processor 120 when the second master device 104 transmits mastership transfer commands to the second processor 122 via the second data stream 114. As described previously, two mastership transfer commands referred to as the 1-to-2 command and the 2-to-1 command may be implemented.

In similarity to the first master device 102, the second master device 104 may be configured to execute various applications in addition to providing the second data stream 114. Therefore, if the second master device 104 is overburdened with tasks, occupied with performing a high priority task, or is otherwise unable to satisfactorily provide the second data stream 114 to a slave device, the second master device 104 may send the 2-to-1 command to the second processor 122. In response to receiving the 2-to-1 command, the second processor 122 may assert the X1 (transfer to master 1) signal to the first processor 120. In response to the asserted the X1 signal, the first processor 120 may de-assert the signal 135, thereby causing the switching device 124 to transfer mastership from the second master device 104 to the first master device 102.

Alternatively, the second master device 104 may send the 1-to-2 command to the second processor 122. For example, the 1-to-2 command may be sent when the second master device 104 examines a data stream (e.g., the data stream 118 shown in FIG. 1) from the slave device and determines that the first master device 102 is not effectively communicating with and/or controlling the slave device. In response to receiving the 1-to-2 command, the second processor 122 may assert the X2 (transfer to master 2) signal to the first processor 120. In response to the asserted X2 signal, the first processor 120 may assert the signal 135, thereby causing the switching device 124 to transfer mastership from the first master device 102 to the second master device 104.

In at least some embodiments, execution of the computer-readable instructions 127 may cause the first processor 120 to sample the H2, X1, and X2 signals at a programmable rate (e.g., once every second). After the first processor 120 has sampled the H2, X1, and X2 signals, a reset signal ("RS") may be transmitted to the second processor 122, which may cause the second processor 122 to reset (de-assert) any asserted H2, X1, and X2 signal. The assertion or reassertion of the H2, X1, and X2 signals may occur as described above.

In summary, the first processor 120 may consider several factors, such as those described above, to manage the switching device 124 such that the first data stream 112 or the second data stream 114 is forwarded to the subsea tool 110. In at least some embodiments, the first processor 120 may manage the switching device 124 according to a prioritization of the health (functional condition) of the master devices 102 and 104, the mastership transfer commands received from the master devices 102 and 104, and timing considerations.

The health of the master devices 102 and 104 may be given first priority and may be indicated to the first processor 120 according to an examination of the first data stream 112 and the H2 signal described above. The mastership transfer commands may be given second priority and may be indicated to the first processor 120 according to the 1-to-2 command, the 2-to-1 command, the X1 signal, and the X2 signal described above. The timing considerations may be given third priority and may be indicated to the first processor 120 by timers that are controlled according to the computer-readable instructions 127. Preferably, the timing considerations permit the first processor 120 to control the switching device 124 such as to maximize the amount of time during which the slave device receives valid commands and/or data.

In particular, the timing considerations may be beneficial when both of the data streams 112 and 114 are indicated to be invalid. In such case, the downtime of communication between the master devices 102 and 104 and the slave device may be minimized by successively switching between transferring the first data stream 112 and the second data stream 114 until one of the data streams 112 and 114 is determined to be valid. Thereafter, the valid data stream may be forwarded until the switching device 124 is instructed otherwise.

The timing considerations also may be beneficial when multiple mastership transfer commands are received within a threshold amount of time. In such case, it may not be desirable to switch back and forth between forwarding the first data stream 112 and the second data stream 114. For example, if the both of the data streams 112 and 114 are valid, then switching between forwarding the first data stream 112 and the second data stream 114 may result in a lower data transfer rate than would exist otherwise. The lower data transfer rate may result from latency associated with operating the switching device 124. Therefore, the timing considerations may prevent mastership transfer commands from being performed if doing so is calculated to improve the overall efficiency of communicating to the slave device.

As shown in FIG. 2, the redundancy manager 106 also may comprise monitoring units 132 and 136. The monitoring units 132 and 136 may comprise one or more electrical-based indicators 134. For example, the electrical-based indicators 134 may comprise light emitting diodes (LEDs). The indicators 134 preferably permit a user to easily inspect the various functions of the redundancy manager 106. For example, the monitoring unit 132 may comprise indicators 134 associated with the health of the first master device 102 ("H1"), the health of the second master device 104 ("H2"), the health of the first processor 120 ("HP1"), the health of the second processor 122 ("HP2"), the first data stream 112 being forwarded ("F1"), and the second data stream 114 being forwarded ("F2"). The monitoring unit 136 may comprise an indicator 134 associated with the assertion and de-assertion of the signal 135 ("SW").

Figure 3:
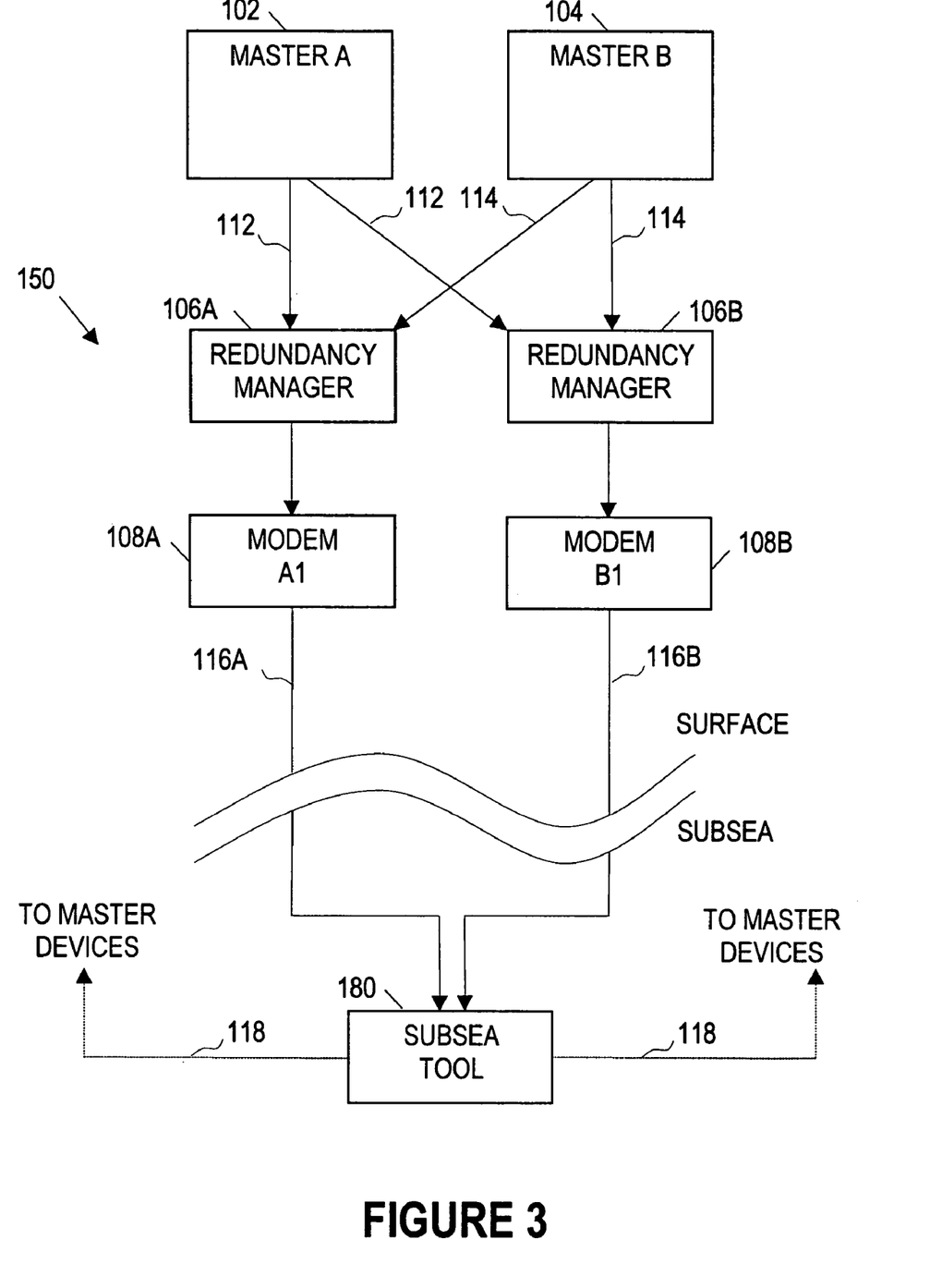
FIG. 3 illustrates another petroleum mining system in accordance with preferred embodiments of the invention.

FIG. 3 illustrates another petroleum mining system 150 in accordance with preferred embodiments of the invention. As shown in FIG. 3, the system 150 may comprise a first master device 102 and a second master device 104 each coupled to two redundancy managers 106A and 106B. The redundancy managers 106A and 106B may each couple to a modem ("MODEM A1" 108A and "MODEM B1" 108B respectively). The modems 108A and 108B may couple to a subsea tool 180 via the conductors 116A and 116B. The master devices 102 and 104, the redundancy managers 106A and 106B, and the modems 108A and 108B may function in the same or similar fashion as the master devices 102 and 104, the redundancy manager 106, and the modem 108 described in FIGS. 1 and/or 2.

The exemplary embodiment of FIG. 3 illustrates that an increased number of data paths (i.e., paths associated with first data stream 112, the second data stream 114, the RMO data, and the data stream 118) may be implemented to further increase the reliability of successful communication to the subsea tool 180.

Figure 4:
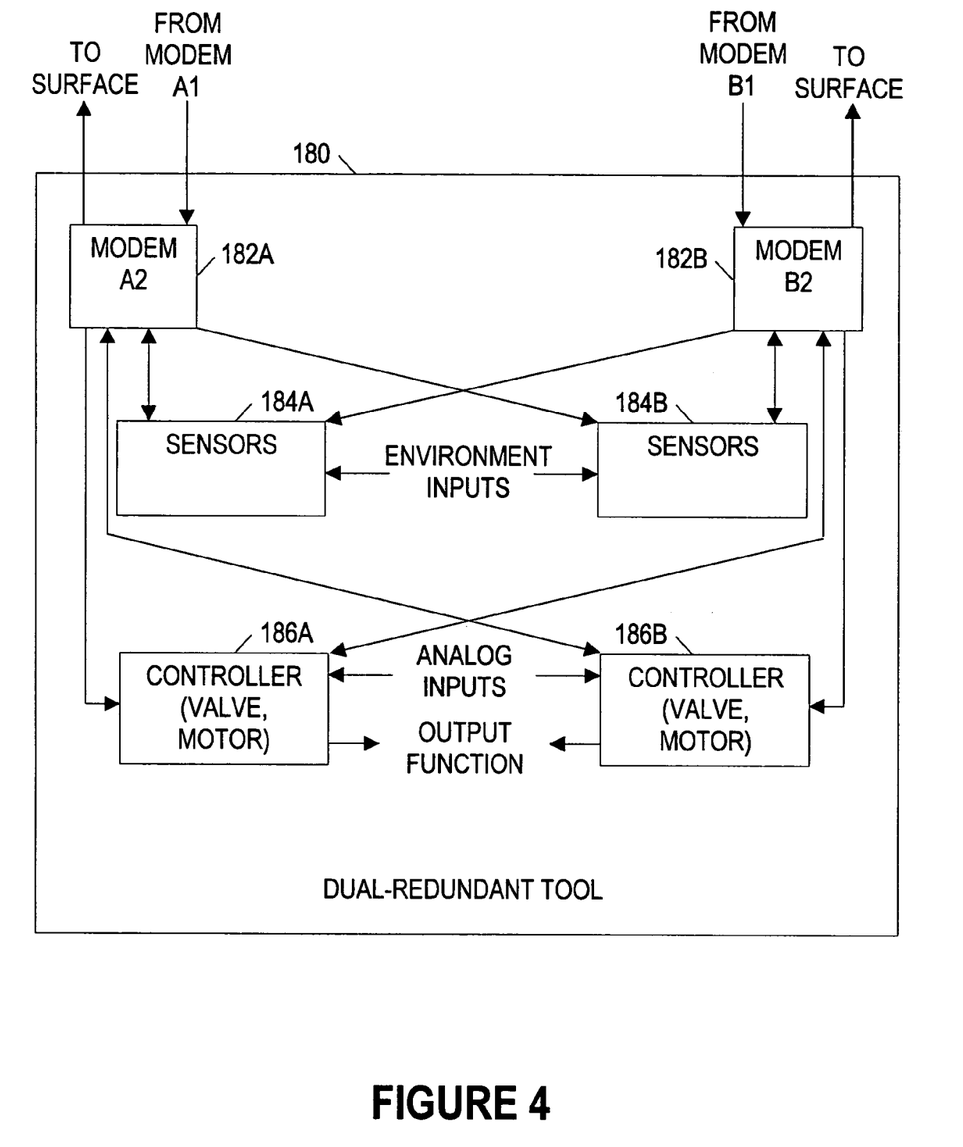
FIG. 4 illustrates a dual-redundant tool that may be used with the petroleum mining system of FIG. 3.

FIG. 4 illustrates a dual-redundant tool 180 that may be implemented with the system 150 of FIG. 3. As shown in FIG. 4, the tool 180 may comprise a modem ("MODEM A2") 182A that is operable to receive a signal from the MODEM A1 108A. The tool 180 may further comprise a modem ("MODEM B2") 182B that is operable to receive a signal from the MODEM B1 108B. The modems 182A and 182B may digitize, demodulate, and decode data streams received from the master devices 102 and 104. The data streams may be provided to sensors 184A and 184B. The sensors 184A and 184B are preferably independent from each other and provide sensor data in response to environment input. The sensor data may be transmitted to the master devices 102 and 104 via the modems 108A and 108B. The data streams also may be provided to controllers 186A and 186B. The controllers 186A and 186B are preferably independent from each other and may be associated with valves, actuators, motors, or other functions of the tool 180. As shown, the controllers 186A and 186B may receive analog input signals and may provide an output function (e.g., controlling a drill, actuator, valve, or other device).

Figure 5:
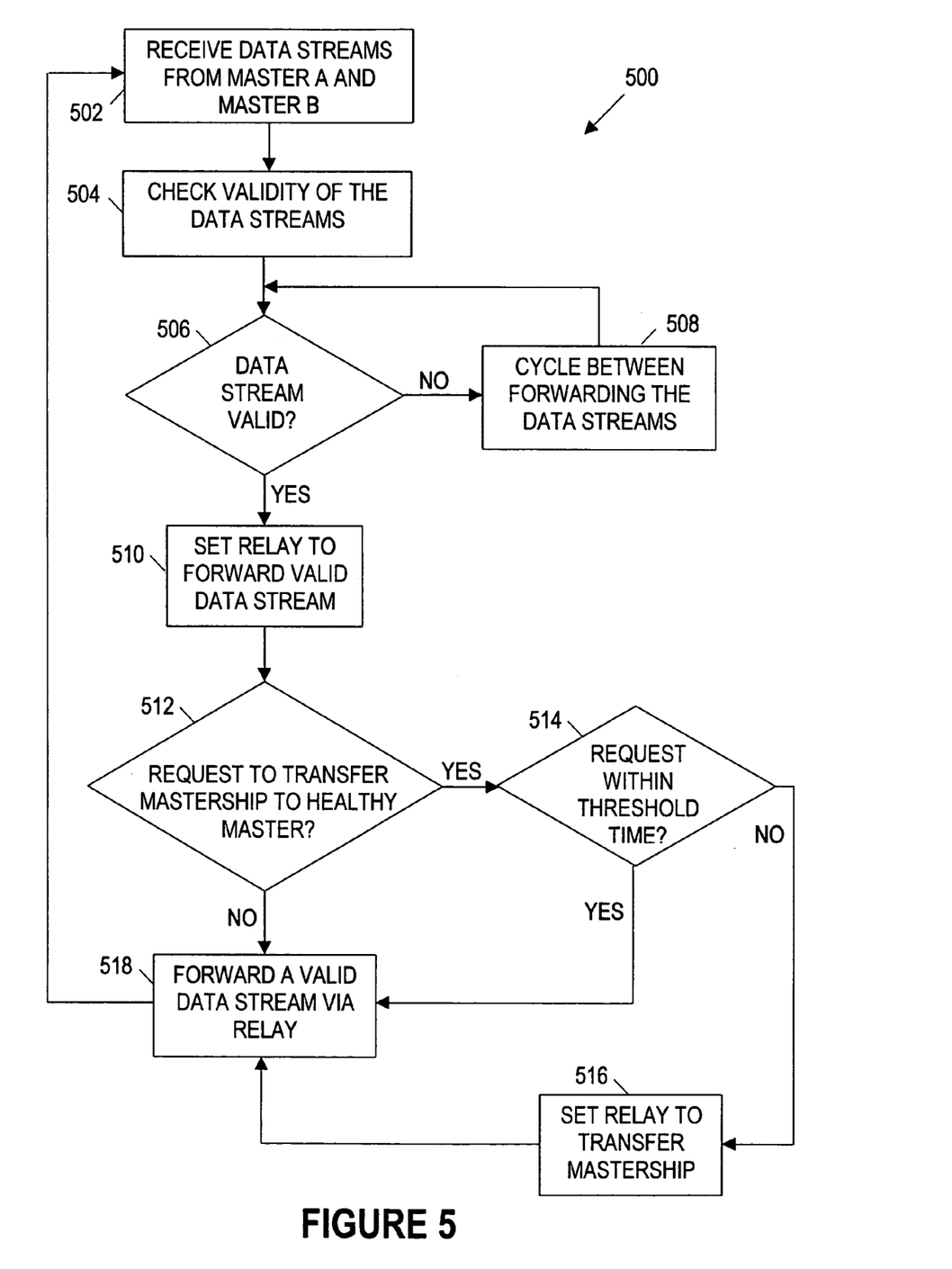
FIG. 5 illustrates a method in accordance with preferred embodiments of the invention.

FIG. 5 illustrates a method 500 in accordance with preferred embodiments of the invention. As shown in FIG. 5, the method 500 may comprise receiving a plurality of data streams from two or more master devices (block 502). The method 500 further comprises checking the validity of the data streams at block 504. If there is not a valid data stream as determined at block 506, the data streams may be forwarded in a cycled (switching back and forth) fashion (block 508). For example, the data streams may be forwarded via a relay that is able to forward one of the plurality of data streams at a time according to a setting of the relay. If none of the data streams are valid, the relay may forward each data stream in turn according to a predetermined pattern and timing. The method 500 may then return to block 506 to determine if there is a valid data stream.

When a data stream is valid as determined at block 506, a relay may be set to forward the valid data stream (block 510). Thereafter, a determination is made as to whether a request to transfer mastership to a healthy master has occurred (block 512). If, at block 512, a determination is made that no request to transfer mastership to a healthy master has occurred, the valid data stream may be forwarded via the relay (block 518). If, at block 512, a determination is made that a request to transfer mastership to a healthy master has occurred, then a determination is made as to whether the request to transfer mastership to a healthy master occurred within a threshold amount of time (block 514).

If, at block 514, a determination is made that the request to transfer mastership to a healthy master occurred within the threshold amount of time, the valid data stream may be forwarded via the relay (block 518). If, at block 514, a determination is made that the request to transfer mastership to a healthy master did not occur within the threshold amount of time, the relay may be set to transfer mastership according to the request (block 516). Thereafter, a valid data stream (from a healthy master device having mastership) may be forwarded via the relay (block 518). The method 500 may be repeated continually to provide efficient, redundant communication from the master devices to one or more slave devices.

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. A system, comprising:
   a first master device generating a first data stream;
   a second master device generating a second data stream, the first and second master devices being independent;
   a redundancy manager coupled to the first and second master devices; and
   a slave device coupled to the redundancy manager,
   wherein the redundancy manager is operable to receive the first data stream from the first master device and the second data stream from the second master device, and
   wherein the redundancy manager is operable to selectively forward one of the first and second data streams to the slave device based on a validity estimation of the first data stream, a validity estimation of the second data stream, mastership transfer commands from the first and second master devices, and timing considerations,
   wherein the timing considerations prevent switching back and forth between forwarding the first data stream and the second data stream if less than a threshold amount of time has passed.

2. The system of claim 1 wherein the first and second master devices comprise computers that are not configured to share data associated with the slave device directly with each other.

3. The system of claim 1 wherein the first and second master devices are in different locations such that a user having access to the first master device is not able to simultaneously access the second master device and vice versa.

4. The system of claim 1 wherein the slave device comprises a subsea tool.

5. The system of claim 4 wherein both of the first and second master devices are configured to simultaneously monitor a data stream from the subsea tool.

6. The system of claim 1 wherein the forwarded data stream causes the slave device to control a valve.

7. The system of claim 1 wherein the forwarded data stream causes the slave device to control an actuator.

8. The system of claim 1 wherein the forwarded data stream causes the slave device to control a motor.

9. A system, comprising:
   a first master device generating a first data stream;
   a second master device generating a second data stream, the first and second master devices being independent;
   a redundancy manager coupled to the first and second master devices; and
   a slave device coupled to the redundancy manager,
   wherein the redundancy manager is operable to receive the first data stream from the first master device and the second data stream from the second master device, and
   wherein the redundancy manager is operable to selectively forward one of the first and second data streams to the slave device,
   wherein the redundancy manager is configured to selectively forward one of the first and second data streams based on a validity estimation of the first data stream, a validity estimation of the second data stream, mastership transfer commands from the first and second master devices, and timing considerations.

10. The system of claim 9 wherein the first and second master devices are configured to send the mastership transfer commands to the redundancy manager in response to user intervention and at least one of data content received from the slave device and a lack of data received from the slave device.

11. A system, comprising:
    a first master device;
    a second master device;
    a redundancy manager coupled to the first and second master devices; and
    a slave device coupled to the redundancy manager,
    wherein the redundancy manager is operable to receive a first data stream from the first master device and a second data stream from the second master device, and
    wherein the redundancy manager is operable to selectively forward one of the first and second data streams to the slave device,
    wherein the redundancy manager is configured to selectively forward one of the first and second data streams based on a validity estimation of the first data stream, a validity estimation of the second data stream, mastership transfer commands from the first and second master devices, and timing considerations,
    wherein the timing considerations prevent switching back and forth between forwarding the first data stream and the second data stream if less than a threshold amount of time has passed.

12. A system, comprising:
    a first master device generating a first data stream;
    a second master device generating a second data stream, the first and second master devices being independent;
    a redundancy manager coupled to the first and second master devices;

a slave device coupled to the redundancy manager; and a second redundancy manager coupled to the first master device, the second master device and the slave device, wherein the second redundancy manager is operable to receive the first and second data streams and forward one of the first and second data streams to the slave device via a second communication path that is separate from a first communication path used to transmit data from the first redundancy manager to the slave device wherein the redundancy manager is operable to receive the first data stream from the first master device and the second data stream from the second master device, and wherein the redundancy manager is operable to selectively forward one of the first and second data streams to the slave device.

13. The system of claim 12 wherein the slave device comprises a redundant subsea tool that is configured to receive data from both the first communication path and the second communication path, wherein the redundant subsea tool comprises redundant sensors and redundant controllers and wherein each sensor and controller is operable to perform a function according to data received from at least one of the first and second communication paths.

14. A redundancy manager device for providing redundant data communication to a slave device, the redundancy manager device comprising:

a first processor; and a switching mechanism coupled to the first processor, wherein the switching mechanism is configured to receive a first data stream associated with a first master device and a second data stream associated with a second master device, wherein the switching mechanism is configured to implement a default configuration that forwards one of the first and second data streams to the slave device, wherein the first processor is configured to provide a switch control signal that causes the switching mechanism to switch between forwarding the first data stream and forwarding the second data stream, wherein the first processor asserts and de-asserts the switch control signal in response to a determination of first and second data stream integrity and mastership transfer commands associated with the first and second master devices.

15. The redundancy manager device of claim 14 further comprising a second processor, wherein the second processor is configured to determine the second data stream and assert a health signal to the first processor when the second data stream is invalid.

16. The redundancy manager device of claim 15 wherein the second processor is further configured to assert a first mastership transfer signal to the first processor in response to a mastership transfer command associated with transferring mastership from the first master device to the second master device.

17. The redundancy manager device of claim 16 wherein the second processor is further configured to assert a second mastership transfer signal to the first processor in response to a mastership transfer command associated with transferring mastership from the second master device to the first master device.

18. The redundancy manager device of claim 17 wherein the first processor is configured to determine if the first data stream is invalid and to periodically determine an assertion state of the health signal, first mastership transfer signal, and the second mastership transfer signal.

19. A redundancy manager device for providing redundant data communication to a slave device, the redundancy manager device comprising:

a first processor; and a switching mechanism coupled to the first processor, wherein the switching mechanism is configured to receive a first data stream associated with a first master device and a second data stream associated with a second master device, wherein the switching mechanism is configured to implement a default configuration that forwards one of the first and second data streams to the slave device, wherein the first processor is configured to provide a switch control signal that causes the switching mechanism to switch between forwarding the first data stream and forwarding the second data stream, wherein the first processor asserts and de-asserts the switch control signal in response to a determination of first and second data stream validity and mastership transfer commands associated with the first and second master devices, the redundancy manager further comprising a second processor, wherein the second processor is configured to determine the second data stream validity and assert a health signal to the first processor when the second data stream is invalid, wherein the second processor is further configured to assert a first mastership transfer signal to the first processor in response to a mastership transfer command associated with transferring mastership from the first master device to the second master device, wherein the second processor is further configured to assert a second mastership transfer signal to the first processor in response to a mastership transfer command associated with transferring mastership from the second master device to the first master device, wherein the first processor is configured to determine if the first data stream is invalid and to periodically determine an assertion state of the health signal, first mastership transfer signal, and the second mastership transfer signal, wherein the first processor is configured to periodically assert a reset signal to the second processor whereby the second processor resets the health signal, the first mastership transfer signal, and the second mastership transfer signal.

20. The redundancy manager device of claim 19 wherein the first processor controls the switch control signal according to a prioritization of the first data stream validity, the health signal, the first mastership transfer signal, the second mastership transfer signal, and an amount of time since the switching mechanism last switched.

21. The redundancy manager device of claim 20 further comprising monitoring units having indicators associated with a health determination of the first master device, a health determination of the second master device, a health determination of the first processor, a health determination of the second processor, a forwarding of the first data stream, a forwarding of the second data stream, and the switch control signal.

22. A system, comprising:

a first master device;

a second master device;

a subsea tool responsive to commands received from the first and second master devices;

means for switching mastership of the subsea tool between the master devices; and means for controlling coupled to the means for switching mastership, wherein the means for controlling asserts and de-asserts a signal to control the means for switching mastership based on requests originating from an active master device and requests originating from an idle master device, wherein the means for controlling further controls the means for switching mastership based on a validity estimation of the data streams from the first and second master devices and timing considerations.

23. The system of claim 22 wherein the first and second master devices are configured to send requests to transfer mastership in response to user input and at least one of data content received from the subsea tool and a lack of data received from the subsea tool.

24. A system, comprising:
a first master device;
a second master device;
a slave device responsive to commands received from the first and second master devices;
means for switching mastership of the slave device coupled between the master devices and the slave device; and
means for controlling coupled to the means for switching mastership, wherein the means for controlling asserts and de-asserts a signal to control the means for switching mastership based on requests originating from an active master device and requests originating from an idle master device, wherein the means for controlling further controls the means for switching mastership based on a validity estimation of the data streams from the first and second master devices and timing considerations, wherein the timing considerations prevent the means for switching mastership from switching back and forth if less than a threshold amount of time has passed.

* * * * *